United States Patent
Ward et al.

(10) Patent No.: US 6,914,097 B2
(45) Date of Patent: Jul. 5, 2005

(54) PROCESS FOR PRODUCING ACID FUNCTIONALIZED POLYOLEFINS AND PRODUCTS

(75) Inventors: Daniel R. Ward, Maineville, OH (US); Douglas C. McFaddin, Cincinnati, OH (US); Bradley P. Etherton, Cincinnati, OH (US)

(73) Assignee: Equistar Chemicals LP, Houston, TX (US)

( * ) Notice: Subject to any disclaimer, the term of this patent is extended or adjusted under 35 U.S.C. 154(b) by 230 days.

(21) Appl. No.: 10/321,224

(22) Filed: Dec. 17, 2002

(65) Prior Publication Data

US 2004/0116569 A1 Jun. 17, 2004

(51) Int. Cl.[7] .................................................. C08F 8/00
(52) U.S. Cl. ................. 525/192; 525/327.4; 525/327.8; 525/383
(58) Field of Search .............................. 525/192, 327.4, 525/327.8, 383

(56) References Cited

U.S. PATENT DOCUMENTS

| | | | |
|---|---|---|---|
| 3,359,154 A | 12/1967 | McIville | 161/235 |
| 3,422,049 A | 1/1969 | McClain et al. | 260/29.6 |
| 3,432,483 A | 3/1969 | Peoples et al. | 260/81.3 |
| 3,746,681 A | 7/1973 | McClain et al. | 260/29.6 |
| 3,972,865 A | 8/1976 | McClain et al. | 526/14 |
| 4,071,581 A | 1/1978 | Yokoyama | 260/878 |
| 5,534,277 A | 7/1996 | Ramesh et al. | 426/129 |
| 6,166,118 A * | 12/2000 | Hyche et al. | 524/315 |
| 6,271,306 B1 | 8/2001 | Rodriguez et al. | 524/845 |
| 6,310,134 B1 | 10/2001 | Templeton et al. | 524/531 |
| 2002/0120038 A1 | 8/2002 | Isomoto et al. | 524/81 |

FOREIGN PATENT DOCUMENTS

GB 981586 1/1965

* cited by examiner

Primary Examiner—Peter D. Mulcahy
(74) Attorney, Agent, or Firm—Gerald A. Baracka; William A. Heidrich

(57) ABSTRACT

A process for producing acid functionalized polyolefins by hydrolyzing maleic anhydride grafts using a dispersion technique is provided. Acid functionalized polyolefin powders produced by the process as well as adhesive blends formulated therewith are also disclosed.

18 Claims, No Drawings

PROCESS FOR PRODUCING ACID FUNCTIONALIZED POLYOLEFINS AND PRODUCTS

BACKGROUND OF THE INVENTION

1. Field of the Invention

The invention relates to a process for producing carboxylic acid functionalized polyolefins from a grafted maleic anhydride precursor. The process involves forming a dispersion of the molten graft precursor in a liquid polar medium containing water and hydrolyzing the anhydride functionality to the corresponding carboxylic acid functionality. The invention also relates to acid functionalized polyolefin powders produced by the process and adhesive blends formulated therewith.

2. Description of the Prior Art

Polyolefins having polar functionality grafted onto the polymer backbone are widely utilized in adhesive blends used to bond layers of dissimilar materials. The grafted component is typically combined with one or more non-grafted resins to produce the adhesive blend. The amount and type of grafted and non-grafted components will vary depending on the end-use application; however, the graft component is often a graft of either an unsaturated carboxylic acid anhydride, such as maleic anhydride, or an unsaturated carboxylic acid, such as fumaric acid. The graft component typically comprises about 5 to 25 weight percent (wt. %) of the adhesive blend.

One important application for adhesive blends of the aforementioned resin types is coextrusion of multi-layer food packaging composites where the adhesives function as "tie layers" to bond the various resin layers of the composite. These resin layers include a wide variety of polar and non-polar polymers employed to provide essential properties such as structural integrity and barriers to permeation of moisture or oxygen. Commonly used resins of this type include, for example, nylon, linear low density polyethylene (LLDPE), ethylene-vinyl alcohol copolymer (EVOH) and the like.

While both maleic anhydride (MAH) and fumaric acid (trans-2-butenedioic acid) can be grafted, MAH has several advantages as a graft monomer. These include higher reactivity, lower melting point which enables it to easily be injected into a reactive extruder as a liquid, and higher volatility which allows unreacted material to be easily removed under vacuum. Also, MAH is less likely to homopolymerize in the grafting process.

As a result of the higher reactivity of MAH, significantly higher graft efficiency is obtained with MAH and it is possible to produce grafted polyolefins having higher levels of functionality at lower cost. For example, while it is possible to produce MAH grafts of polyethylenes containing 2.5 wt. % MAH and, in some cases, up to 4 wt. % MAH, graft levels obtained with fumaric acid typically only range from about 0.25 up to about 2 wt. % even with optimal reaction conditions. While useful adhesive blends can be obtained utilizing graft components having reduced levels of functionality, it usually requires the use of a significantly higher concentration of the graft component in the adhesive blends. Since the graft component is generally one of the most expensive components of the adhesive blends, this increases the cost to the processor.

Even though it is possible to produce graft components having higher functionality using MAH, fumaric acid grafts can be used at higher temperatures in food packaging structures. Whereas both MAH and fumaric acid graft copolymers are approved for direct food contact usage under 21 CFR 177.1520, fumaric acid-grafted polyethylene (obtained by the polymerization of ethylene followed by reaction with fumaric acid in the absence of free radical initiators) is sanctioned for use at temperatures exceeding 49° C. while ethylene-maleic anhydride copolymers are not.

It would be highly advantageous if fumaric acid grafts having increased functionality blends were available. It would be even more desirable if functionality levels comparable to those achieved with MAH grafted polyolefins could be obtained with fumaric acid. It would be most advantageous if a process were available whereby both of the foregoing objectives could be realized without directly grafting fumaric acid but rather by converting anhydride functionalized polymers to their fumaric acid counterparts. These and other advantages are realized by the process of the present invention which is described in detail to follow.

SUMMARY OF THE INVENTION

The invention provides a process for producing carboxylic acid functionalized polyolefins. More specifically, the process comprises combining a maleic anhydride grafted polyolefin with a nonionic surfactant and polar liquid medium containing at least 50 wt. % water; heating the mixture above the melting point of the polyolefin; agitating the mixture to disperse the polyolefin in the polar liquid medium and convert substantially all anhydride functionality to carboxyl functionality; cooling the dispersion below the melting point of the polyolefin; and recovering the hydrolyzed carboxylic acid functionalized polyolefin powder. Preferably the grafted polyolefin is a polyethylene grafted with from 0.5 up to 5 wt. % maleic anhydride and the nonionic surfactant is a block copolymer of ethylene oxide and propylene oxide. In an especially useful embodiment the grafted polyolefin is high density polyethylene or linear low density polyethylene grafted with maleic anhydride.

Carboxylic acid functionalized polyolefins obtained by the process are analogous to those produced by grafting polyolefins with fumaric acid; however, with the present process it is possible to achieve higher levels of carboxylic acid functionality than by direct grafting with fumaric acid. Furthermore, functionalized products produced by the present process are obtained as fine powders. Powders obtained by the process will have acid number values from about 5 to about 60 and melt indexes from 1 to 100 g/10 min. Powder particle sizes can range from 5 to 250 microns. Most preferably, melt indexes will be in the range 5 to 25 g/10 min.

The carboxylic acid functionalized products obtained by the process of the invention are used to formulate adhesive blends useful for bonding film layers in multilayer constructions and as heat seal layers. Adhesive blends produced with these products will contain 75 to 97.5 wt. % of a non-functionalized base resin or resin blend and 2.5 to 25 wt. % of the carboxylic acid functionalized polyolefin. Adhesive blends wherein the base resin is LLDPE and the acid functionalized polyolefin is derived from maleic anhydride grafts of HDPE or LLDPE are particularly advantageous for food packaging applications.

DETAILED DESCRIPTION

In accordance with the invention, there is provided a convenient and highly efficient process for producing polyolefins containing carboxylic acid and, more specifically, fumaric acid functionality. With this process it is possible to obtain polyolefins containing higher levels of fumaric acid functionality than heretofore possible by directly grafting fumaric acid onto a polyolefin backbone. The process has the added benefit of producing products which are obtained as fine powders. Still another benefit is the ability to obtain fumaric acid functionalized polyolefins which have extremely low levels of extractables, i.e., residual functional monomer and other water soluble components.

The process involves converting a polyolefin grafted with MAH, referred to herein as the precursor graft, to the corresponding fumaric acid functionalized product. This is accomplished by hydrolyzing the anhydride groups of a precursor graft to carboxylic acid groups. The hydrolysis is carried out using an aqueous dispersion of the MAH grafted polyolefin heated above the melting point of the polyolefin. Since the functionalized polyolefin polymer products produced by the process of the invention are analogous to products produced by grafting fumaric acid, but are obtained by a conversion technique, they are referred to herein as fumaric acid functionalized polymers to distinguish them from fumaric acid grafted polymers which are obtained by direct grafting of fumaric acid.

MAH grafted polyolefins used in the process are known and, most commonly, are grafted ethylene or propylene homopolymers or copolymers. As used herein, grafting denotes covalent bonding of the MAH to the polymer chain.

The MAH grafted polyolefins may be prepared in solution, in a fluidized bed reactor, by melt grafting or irradiation grafting. Particularly useful grafted polyolefins for the invention are conveniently prepared by melt grafting, i.e., by reacting the MAH and polyolefin in the substantial absence of a solvent. This is generally accomplished in a shear-imparting reactor, such as an extruder/reactor. Twin screw extruder/reactors such as those marketed by Coperion (formerly Werner-Pfleiderer) under the designations ZSK-53, ZSK-83 and ZSK-92 are commonly used. A free radical generating catalyst, such as a peroxide catalyst, can be employed but is not necessary.

The melt grafting reaction is carried out under conditions selected to minimize or avoid rapid vaporization and consequent losses of the MAH and any catalyst that may be employed. The MAH concentration is typically about 1 to about 5 wt. % based on the total reaction mixture weight. A temperature profile where the temperature of the polyolefin melt increases gradually along the length of the extruder/reactor up to a maximum in the grafting reaction zone, and then decreases toward the reactor exit is preferred. The maximum temperature within the extruder/reactor is generally maintained at or below about 300° C.

Polyethylenes grafted with MAH in accordance with the above procedures are preferably converted by the present process. As used herein, the term polyethylenes encompasses ethylene homopolymers and copolymers of ethylene with $C_{3-8}$ α-olefins, primarily propylene, butene-1, hexene-1 and octene-1. Graft monomer contents, i.e., the amount of MAH reacted, can range from about 0.5 up to about 5 wt. % and, more typically, will be from 1 to 4 wt. %. Highly useful precursor grafts for the process of the invention are MAH grafted high density polyethylenes (HDPEs) having densities greater than 0.940 g/cm$^3$ and MAH grafted linear low density polyethylenes (LLDPEs) having densities up to 0.939 g/cm$^3$. HDPEs with densities from 0.945 to 0.962 g/cm$^3$ and LLDPEs having densities from 0.880 to 0.939 g/cm$^3$ grafted with 1 to 4 wt. % MAH are particularly advantageous. It is especially useful when the MAH grafted HDPE and LLDPE resins have a melt index (MI) from 5 to 20 g/10 min. MIs are determined in accordance with ASTM D 1238-01, Condition 190/21.6.

A dispersion technique is employed to convert the MAH grafted polyolefin to the corresponding fumaric acid functionalized polymer. For the process the MAH grafted polyolefin is charged to a reactor with a polar liquid containing at least 50 wt. % water and a nonionic surfactant and the mixture is heated above the melting point of the grafted polymer while forming a dispersion using conventional dispersing procedures. The dispersing apparatus may be any device capable of delivering sufficient shearing action to the mixture at elevated temperature and pressure. Conventional propeller stirrers designed to impart high shear and which are commercially available can be used for this purpose. The reactor may also be equipped with baffles to assist in dispersion. Agitation rates can vary over wide limits, but the speed of the stirrer will usually be controlled so that the tip speed is between about 500 and 3500 ft/min and, more preferably, 750 and 3000 ft/min.

The process is carried out in an autoclave since this permits the process to be conducted at elevated temperature and pressure. In batch operations, all of the ingredients are charged to the autoclave and the mixture is heated to a temperature above the melting point of the precursor graft. While the temperature will vary depending on the specific polymer being used, it will typically range from about 90° C. to 250° C. Since the fluidity of polymers is temperature related, it may be desirable to carry out the process at temperatures substantially above the melting point of the grafted polymer to facilitate dispersion and achieve the desired droplet size. Temperatures should not, however, exceed the thermal degradation temperature of the polymer.

Agitation is commenced after the desired temperature is reached and is continued until a dispersion having the desired droplet size is produced and hydrolysis is complete or substantially complete. The length of time required to achieve complete or substantially complete hydrolysis will vary depending on the particular precursor graft being used, temperature, agitation rate, amount and type of surfactant, and other process variables, but generally ranges from about 3 minutes to about 1 hour. Most generally, stirring is maintained for a period from 5 to 30 minutes.

Other polar liquids which are not solvents for the precursor polymer and carboxylic acid functionalized product may also be used with the water to form the dispersions. These polar mediums are hydroxylic compounds and can include alcohols and polyols and mixtures thereof. It is particularly advantageous to use water as the dispersing medium or a medium where water is the major component. The weight ratio of the liquid medium, i.e., water or the combination of water and other polar liquid to grafted polymer will range from about 1:1 to about 9:1 and, more preferably, from 1:1 to 5:1. The pressure of the process is not critical so long as a liquid phase is maintained and can range from about 1 up to about 100 atmospheres. The process can be conducted at autogenous pressure or the pressure can be adjusted to exceed the vapor pressure of the liquid medium at the operating temperature. Most generally, with aqueous dispersions the pressure will range from about 5 to 30 atmospheres.

In order to obtain suitable dispersions, one or more dispersing agents are necessarily employed. Useful dispersing agents are nonionic surfactants which are block copolymers of ethylene oxide and propylene oxide. Preferably, these nonionic surfactants are water-soluble block copolymers of ethylene oxide and propylene oxide and have molecular weights greater than about 3500. Most will contain a major portion by weight of ethylene oxide and are obtained by polymerizing ethylene oxide onto preformed polyoxypropylene segments. The weight ratio of nonionic surfactant to MAH grafted polyolefin can range from about 0.05:1 to 5:1. Most preferably, the weight ratio of nonionic surfactant to precursor graft is from 0.1:1 to 0.5:1.

One class of useful nonionic surface active agents is manufactured and sold by BASF Corporation under the trademark Pluronic. These products are obtained by polymerizing ethylene oxide onto the ends of a preformed polymeric base of polyoxypropylene. Both the molecular weight of the polyoxypropylene base and the polyoxyethylene segments can be varied to yield a wide variety of products. One such compound found to be suitable for the process is a product designated as F-98 wherein a polyoxypropylene of average molecular weight of 2,700 is polymerized with ethylene oxide to give a product of molecular weight averaging about 13,500. This product contains about 20 weight percent propylene oxide and about 80 weight percent ethylene oxide. Other effective Pluronic surfactants include F-88 (M.W. 11,250, 20% propylene oxide, 80% ethylene oxide), F-108 (M.W. 16,250, 20% propylene oxide, 80% ethylene oxide), and P-85 (M.W. 4,500, 50% propylene oxide, 50% ethylene oxide). These compounds, all containing at least about 50 weight percent ethylene oxide and having molecular weights of at least about 4,500, are highly effective as dispersing agents for the process.

Another class of useful nonionic surfactants is sold under the trademark Tetronic. These surfactants are prepared by building propylene oxide block copolymer chains onto an ethylenediamine nucleus and then polymerizing with ethylene oxide. Tetronic 707 and Tetronic 908 are most effective for the present process. Tetronic 707 has a 30 weight percent polyoxypropylene portion of about 2,700 molecular weight polymerized with a 70 weight percent oxyethylene portion to give an overall molecular weight of about 12,000. Tetronic 908, on the other hand, has a 20 weight percent polyoxypropylene portion of about 2,900 molecular weight polymerized with an 80 weight percent oxyethylene portion to give an overall molecular weight of about 27,000.

When hydrolysis is complete, i.e. when all or substantially all of the anhydride functionality has been converted to carboxylic functionality, heating is terminated and the mixture is allowed to cool to below the melting point of the fumaric acid functionalized polymer while maintaining agitation. When sufficiently cooled, the fumaric acid functionalized polymer powder is recovered using conventional recovery, washing and drying techniques such as those disclosed in U.S. Pat. Nos. 3,422,049, 3,432,483 and 3,746,681 which are incorporated herein by reference.

Acid functionalized polymers produced in accordance with the above-described process are obtained as fine powders. Powder particle sizes can vary widely depending on process conditions; however, the median particle size will most commonly be in the range 5 to 250 micrometers ($\mu$m). It is possible to produce microfine acid functionalized powders, i.e. powders having median particle sizes from 5 to 50 $\mu$m using carefully controlled dispersion conditions and/or by classifying the powders after production. Such small particle size functionalized powders may advantageously used as a component in a powder coating or powdered hot melt adhesive or as an additive in paints, coatings, inks and toners. If desired the powders may be converted to pellets or other forms more suitable for handling in particular applications. Particle sizes referred to herein are median particle sizes determined by laser light scattering using a Malvern Instruments particle size analyzer. Other methods, for example a Coulter counter, may also be used.

The amount of carboxylic functionality present will depend on the particular precursor graft used for the process. In general, however, acid numbers (AN) values of the carboxylic acid functionalized products obtained will range from about 5 to about 60. Products produced by the process having ANs from 10 to 30 are particularly advantageous. Acid numbers can be determined by the method described in ASTM D1356-98. It consists of a colorimetric titration of a xylene solution of the precursor graft with ethanolic potassium hydroxide. Acid number values used herein are reported as milligrams of KOH per gram of sample (mg KOH/g). The carboxylic acid functionalized polyolefins will have M's from 1 to 50 g/10 min and, more preferably, from 5 to 20 g/10 min. The carboxylic acid functionalized polyolefin can be further characterized by infrared spectroscopy. The FTIR (Fourier Transform Infrared) spectrum shows a strong absorption at 1790 $cm^{-1}$, characteristic of carboxylic acid, but no absorption at 1710 $cm^{-1}$, which is characteristic of carboxylic acid anhydrides. The relative amounts of carboxylic acid and carboxylic acid anhydride which are present can be determined.

For the present process, it is desirable to convert all or substantially all of the carboxylic acid anhydride functionality to carboxylic acid moieties. As employed herein, the terms "substantially complete" and "substantially all" indicate 98% or greater conversion of acid anhydride to carboxylic acid.

The acid functionalized polyolefin products are further characterized by having extremely low levels of extractables as a result of the dispersion by which they are produced. This is a highly advantageous aspect of the invention in view of the strict hexane and xylene extractables requirements imposed by the Food and Drug Administration for olefin polymers used as articles or components of articles intended for use in contact with food.

While the carboxylic acid functionalized products may be used as such, they are most commonly utilized as one of the components of adhesive blends. Adhesive blends are widely used as tie layers for bonding the layers of multilayer constructions. The blends are typically comprised of a minor proportion of anhydride or carboxylic acid functionalized polymer and a major proportion of base resin which can be a single polyolefin or, as is more commonly the case, a combination of two or more polyolefins.

The polyolefin(s) comprising the base resin can be the same or different ethylene homopolymer or copolymer used for the maleic anhydride grafted precursor and will have a MI from 0.1 to 100 g/10 min. For some applications the adhesive blends are obtained using a base resin which is a mixture of a highly crystalline polyolefin and an elastomeric polyolefin. As used herein, the terms "rubber," "elastomer" or "elastomeric" refers to products having rubber-like properties and little or no crystallinity.

Polyolefins used for the base resin can include ethylene homopolymers; copolymers of ethylene with $C_{3-8}$ $\alpha$-olefins, vinyl carboxylates and alkyl acrylates; terpolymers of ethylene and propylene with diene monomers; propylene homopolymers; polyisobutylene; and copolymers of isobutylene and isoprene. Ethylene homopolymers and copolymers can include low density polyethylene (LDPE); medium density polyethylene (MDPE); HDPE; LLDPE; so-called very low density polyethylene (VLDPE); so-called ultra low density polyethylene (ULDPE); ethylene-vinyl acetate (EVA) copolymers; ethylene-acrylate copolymers such as ethylene-methyl acrylate copolymer and ethylene-n-butylacrylate copolymers; ethylene-acrylic acid copolymers; ethylene-methacrylic acid copolymers; metal salts of ethylene-methacrylic or methacrylate copolymers, i.e., ionomers; or the like.

Useful ethylene copolymer rubbers can include ethylene-vinyl acetate copolymers, ethylene-alkyl acrylate copolymers, and ethylene-α-olefin copolymers. These rubbery copolymers will generally have melt indexes from 0.1 to 100 g/10 min. and, more preferably, from 0.2 to 10 g/10 min. Densities will typically range from 0.850 to 0.980 g/cm$^3$. Useful vinyl-acetate copolymers will generally contain from 8% to 60% vinyl acetate and, more preferably, from 10% to 50% vinyl acetate. The ethylene-alkyl acrylate copolymers will generally have from 1% to 50% and, more preferably, from 5% to 50% alkyl acrylate copolymerized and ethylene-methyl acrylate and ethylene-n-butyl acrylate copolymers are particularly useful elastomeric polymers of this type.

Ethylene-propylene rubber (EPR) and ethylene-propylene-diene rubber (EPDM) are highly useful elastomeric components for the compositions of the invention. These elastomers typically contain greater than 50 wt. % ethylene and, in one highly useful embodiment of the invention, an EPR or EPDM containing 60% or more ethylene is utilized. Products of this type are obtained by conventional polymerization procedures known to the art and include the so-called metallocene plastomers.

Illustrative elastomers of the above type and which are available from commercial sources include BUNA EPT 2070 (22 Mooney ML(1+4)125° C., 69% ethylene), BUNA EPT 2370 (16 Mooney, 3% ethylidene norbornene, 72% ethylene, 25% propylene), BUNA 2460 (21 Mooney, 4% ethylidene norbornene, 62% ethylene, 34% propylene), KELTAN EPDM DE244 (55 Mooney, 71% ethylene, 28.8% propylene, 0.2% ethylidene norbornene) and ENGAGE 8100 (23 Mooney (ML(1+4) 121° C., 62% ethylene, 38% octene-1) or ENGAGE 8200 (8 Mooney, 62% ethylene, 38% octene-1).

Still other elastomeric products can be included in the base resin. These include, for example, chlorinated copolymers of isobutylene and isoprene, copolymers of butadiene and styrene, copolymers of isoprene and styrene, block copolymers of butadiene and styrene, block copolymers of isoprene and styrene, block copolymers of isoprene and vinyl toluene, hydrogenated copolymers of butadiene and stryene, hydrogenated block copolymers of isoprene and styrene, copolymers of acrylonitrile and butadiene, copolymers of methacrylonitrile and butadiene, copolymers of acrylonitrile and isoprene, copolymers of methacrylonitrile and isoprene, and the like.

The adhesive blend will contain 75 to 97.5 wt. % and, more preferably, 80 to 95 wt. % base resin. If the base resin is comprised of both crystalline and elastomeric polymers, the weight ratio of crystalline to rubbery polymers is from 15:1 to 1:1 and, more preferably, 10:1 to 1.5:1. The fumaric acid functionalized polyolefin will constitute 2.5 to 25 wt. % and, more preferably, 5 to 20 wt. % of the adhesive blend. Since fumaric acid functionalized polyolefins are approved for use for direct food contact, adhesive blends containing the acid functionalized products obtained by the process of the invention are highly useful for food packaging applications. For such applications, however, the base resin(s) and other optional additives used to formulate the adhesive blend must also be approved for direct food contact. Adhesive blends of this type are advantageously used for coextrusion of multi-layer food packaging composites where they can be used as a tie layer or heat-seal layer. Particularly useful blends for food packaging uses, including direct food contact applications, utilize LLDPE as the base resin.

Adhesive blends formulated using the functionalized polyolefins of the invention are prepared by melt mixing the base resin(s) and functionalized polyolefin plus any optional components or additives using conventional mixing methods. For example, all of the components can be combined and blended in a Banbury mixer or a compounding extruder. Adhesive blends produced in this manner can be pelletized and stored for subsequent use.

For most applications the adhesive blends will also contain one or more stabilizing agents, such as antioxidants, thermal stabilizers, acid neutralizing agents, and the like. The type and amount of these stabilizing agents will depend on the end use application. These additives and others may be added as the components are being melt blended or pre-incorporated with one or more of the components before the final blending operation, for example, in a masterbatch.

In addition to being useful for food packaging applications, adhesive blends formulated using acid functionalized polyolefins produced in accordance with the invention may also be utilized for a variety of other bonding applications including bonding plastic, wood, glass, paper, fibers, composite, and metal substrates. They can be used for lamination, extrusion and coextrusion, sheet extrusion/coextrusion, extrusion/coextrusion lamination, extrusion/coextrusion coating, injection blow molding, melt thermoforming and the like.

Monolayer films can also be prepared from the adhesive blends of the present invention. Such films can be prepared by conventional means such as blown film extrusion and cast film extrusion. The monolayer films made by these processes are particularly useful for subsequent lamination onto the substrates listed above.

In a typical form of construction a substrate, which is commonly a polymer, is coated with a layer of an adhesive blend formulated using functionalized polymers of the invention on all or a portion of one side of the substrate. Two-layer film constructions of this type can be folded back on themselves and heat-sealed. Useful three-layer constructions where a substrate material is sandwiched between two layers of adhesive blend or where the adhesive blend is between two similar or dissimilar substrates are also possible.

Numerous other multi-layer constructions specifically designed to meet the requirements of various applications are possible by incorporating additional layers of materials. Representative constructions include the following where "tie" indicates an adhesive blend produced from one or more base resins and a functionalized polyolefin obtained by the process of the invention and "FCL" represents an appropriate food contact/layer such as HDPE, LLDPE, EVA, ethylene-acrylic acid copolymers, ethylene-methacrylic acid copolymers or ionomers:

HDPE/Tie/Nylon/Tie/FCL
LDPE/Tie/Nylon/Tie/FCL
HDPE/Tie/EVOH/Tie/FCL
LDPE/Tie/EVOH/Tie/FCL
Nylon/Tie/Nylon/Tie/FCL
LLDPE/Tie/EVOH/Tie/FCL
Nylon/EVOH/Nylon/Tie/Nylon/Tie/FCL In a highly useful embodiment it is possible to replace two layers (the FCL and tie layers) in structures such as those depicted above with a single layer of an adhesive blend formulated using the fumaric acid functionalized polyolefins of the invention. Such constructions could provide improved seal integrity at high temperatures and improved melt adhesion for cook-in meat applications.

Constructions of the above types could be used for numerous food packaging applications including, but not limited, to snack foods, cereals, baking mixes, and the like. They can also be used to form bags, casings, etc. for packaging meat and poultry products and have particular utility for cook-in packaging applications.

EXAMPLES

The following examples illustrate the invention. Those skilled in the art will recognize many variations that are within the spirit of the invention and scope of the claims.

Preparation of Acid Functionalized Polyolefins

A polyolefin grafted with maleic anhydride was converted to the corresponding fumaric acid functionalized product. For the process, 454 grams of a precursor graft (HDPE grafted with 2 wt. % MAH; MI 10 g/min; melting point 128° C.), 830 ml. of deionized water and 180 grams of nonionic surfactant (PLURONIC F98) were charged to an autoclave reactor. The reactor was comprised of a cylindrical two liter, 4 inch in diameter pressure vessel (Parr Instrument Company) equipped with a safety head, a thermowell, a pressure gauge, along with a stirrer bearing and shaft. Attached to the shaft were three impellers containing 6 equally spaced blades. The shaft was turned with a fractional horsepower electrical motor.

The reactor and its contents were heated to 215° C. and stirred at 1500 rpm to disperse the molten polymer in the aqueous medium. Stirring was continued for 5 minutes at 215° C. after which time heating was terminated. The reactor was emptied through an air actuated valve into a receiving vessel containing cold water. The resulting fine powder product was recovered by filtration of the slurry after thorough washing with ambient temperature deionized water. The powder cake was dried at room temperature under a constant air circulation for several days and then analyzed.

Analysis of the recovered product by FTIR confirmed that greater than 98% of the anhydride functionality of the grafted MAH precursor was converted to the carboxylic acid counterpart, namely, fumaric acid. Furthermore, while the precursor graft contained 10 ppm free MAH, no free MAH was detectable in the converted product. The AN of the converted product was 20 mg KOH/g. Extractions performed on the recovered powder with hexane (at 50° C.) and xylene (at 25° C.) indicated only 0.16 wt. % hexane extractables and 0.55 wt. % xylene soluble material. The powder was a free-flowing powder having a median particle size of 50 μm.

Preparation of Adhesive Blends

Adhesive blends containing varying amounts of the above-prepared carboxylic acid functionalized powder and LLDPE were prepared. The LLDPE base resin used was an ethylene-butene-1 copolymer having an MI of 2 g/10 min and density of 0.918 g/cm³. Three blends containing 8.5, 10 and 11.5 wt. % of the fumaric acid functionalized powder were produced by melt blending in a twin screw extruder (¾" screw diam; L/D 24:1; 85 rpm) at 415° F.

Test of Adhesive Blends as Tie Layer

The adhesive blends were used to produce 3-mil thick and 5-mil thick 5-layer HDPE/adhesive blend/EVOH/adhesive blend/HDPE coextruded films. The HDPE resin was ALATHON M6210 sold by Equistar Chemicals, LP, and had a density of 0.962 g/cm³ and MI of 1.0 g/10 min. The EVOH resin was SOARNOL DC3203F sold by Nippon Gohsei. It was a copolymer of 32% ethylene, 68% vinyl alcohol and had a density of 1.19 g/cm³ and a MI of approximately 1.5 g/10 min. The relative percentages of layers comprising the films was 43/3/8/3/43. Accordingly, the thickness of the adhesive blend tie layers in the 3-mil thick films was 0.1 mil and 0.15 mil in the 5 ml thick films. Peel strengths of film samples prepared with each of the three adhesive blends were determined using a 90° peel test (ASTM D 1876) after conditioning the samples for 4 days at room temperature. The peel strength results reported in lbs/in were as follows:

| Acid Content of Functionalized Polymer in Adhesive Blend | Film Thickness | Peel Strength |
| --- | --- | --- |
| 8.5 wt. % | 3 mil | 0.49 |
| 10 wt. % | 3 mil | 0.71 |
| 11.5 wt. % | 3 mil | 0.70 |
| 8.5 wt. % | 5 mil | 0.87 |
| 10 wt. % | 5 mil | 1.09 |
| 11.5 wt. % | 5 mil | 1.19 |

The above data demonstrate that adhesive blends prepared with the fumaric acid functionalized polymers of the present invention perform well as tie layers.

Test of Adhesive Blends as a Heat Seal Layer

The effectiveness of the adhesive blends formulated using the carboxylic acid modified products as seal layers was also demonstrated by heat sealing 5-mil monolayer cast film of the blends through three types of contamination. For these tests the blends containing 10 wt. % of the carboxylic acid functionalized polyolefin product and 90 wt. % LLDPE were used. The cast film was extruded using a Brabender single screw extruder (¾" diam; LJD 24:1; 80 rpm) with a 4" film die.

The three contaminants used were deionized water, canola oil and flour (Gold Medal baking flour). The liquid contaminants were applied by painting the contaminant onto the film sample with a ½ inch nylon brush. A different brush was used for the two materials. The water beaded up, but spread out to form a thin layer between the two pieces of film when they were sandwiched together. The canola oil formed a uniform coating when brushed on, but also spread out when sandwiched between the film pieces. The excess was carefully wiped off of the exterior. To apply the flour, a pinch was dropped onto the films and spread over the surface by hand. The sample was then turned sideways and gently tapped so that excess flour fell off the film. A fine dusty layer remained.

Two pieces of the contaminant-treated film (1.5 in.×3.0 in.) were placed face-to-face between two 2-mil sheets of Teflon and then heat sealed at 400° F. and 40 psig for 1.5 sec. The samples were then allowed to equilibrate overnight. A 1.0 in.×3.0 in. sample was then cut and the peel strength measured in a T-peel test at a peel rate of 10 in./min. Peel values reported below in lbs./in. are the average of two tests.

| Contamination | Peel Strength |
| --- | --- |
| Water | 14.1 |
| Oil | 13.4 |
| Flour | 5.0 |

For comparison, a control adhesive blend was prepared using 10 wt. % precursor MAH graft and 90 wt. % of the LLDPE. Five-mil film of the comparative blend was prepared and evaluated for heat seal through contamination using the above-described procedure. Peel strengths obtained with the comparative blends (average of 2 tests) are reported below.

| Contamination | Peel Strength |
|---|---|
| Water | 13.1 |
| Oil | 11.6 |
| Flour | 4.7 |

With all types of contamination, an improved heat seal was obtained using films of the adhesive blends containing the functionalized acid product obtained by the process of the invention.

We claim:

1. A process for producing fumaric acid functionalized polyolefins comprising:
    (a) combining a maleic anhydride grafted polyolefin with a nonionic surfactant and polar liquid medium containing at least 50 wt. % water;
    (b) heating the mixture above the melting point of the polyolefin;
    (c) agitating the mixture to disperse the polyolefin in the polar liquid medium and convert substantially all of the anhydride functionality to carboxylic functionality;
    (d) cooling the dispersion below the melting point of the polyolefin; and
    (e) recovering the carboxylic acid functionalized polyolefin powder.

2. The process of claim 1 wherein the weight ratio of polar liquid medium to grafted polyolefin is from 1:1 to 9:1 and the weight ratio of nonionic surfactant to grafted polyolefin is from 0.05:1 to 5:1.

3. The process of claim 2 wherein the grafted polyolefin is a polyethylene grafted with from 0.5 up to 5 wt. % maleic anhydride and the nonionic surfactant is a block copolymer of ethylene oxide and propylene oxide.

4. The process of claim 3 wherein the grafted polyethylene is high density polyethylene (HDPE) or linear low density polyethylene (LLDPE) grafted with from 1 to 4 wt. % maleic anhydride.

5. The process of claim 4 wherein the grafted HDPE and LLDPE have a melt index (MI) from 5 to 20 g/10 min.

6. The process of claim 3 wherein the nonionic surfactant contains at least 50% ethylene oxide and has a molecular weight of at least 4500.

7. The process of claim 6 wherein the ionionic surfactant contains about 80% ethylene oxide and about 20% propylene oxide and has a molecular weight of about 11,250 to about 16,250.

8. The process of claim 6 wherein the nonionic surfactant contains about 50% propylene oxide and 50% ethylene oxide and has a molecular weight of about 4500.

9. The process of claim 3 wherein the mixture is heated to 90° C. and 250° C. and the agitator tip speed is from 500 to 3500 ft./min.

10. A fumaric acid functionalized polyolefin powder having a median particle size from 5 to 250 micrometer produced by the process of claim 1, said functionalized polyolefin having an acid number from 5 to 60 mg KOH/g and MI from 1 to 20 g/10 min.

11. The functionalized polyolefin powder of claim 10 having an acid number of 10 to 30 mg KOH/g and MI from 5 to 15 g/10 min.

12. The functionalized polyolefin powder of claim 11 having a median particle size of 5 to 50 micrometers.

13. The functionalized polyolefin powder of claim 10 which is derived from HDPE or LLDPE grafted with 1 to 4 wt. % maleic anhydride and having an MI from 5 to 15 g/10 min.

14. An adhesive blend comprised of 2.5 to 25 wt. % fumaric acid functionalized polyolefin powder having a median particle size from 5 to 250 micrometer obtained by the process of claim 1, said functionalized polyolefin having an acid number from 5 to 60 mg KOH/g and MI from 1 to 20 g/10 min, and 75 to 97.5 wt. % polyolefin base resin.

15. The adhesive blend of claim 14 wherein the base resin is an ethylene homopolymer or copolymer having an MI from 0.1 to 100 g/10 min.

16. The adhesive blend of claim 15 wherein the base resin is LLDPE.

17. The adhesive blend of claim 15 comprised of 80 to 95 wt. % base resin and 5 to 20 wt. % fumaric acid functionalized polyolefin.

18. The adhesive blend of claim 15 wherein the functionalized polyolefin is derived from HDPE and LLDPE grafted with 1 to 4 wt. % maleic anhydride and having an MI from 5 to 20 g/10 min.

* * * * *